US011461300B2

(12) United States Patent
Adibowo

(10) Patent No.: US 11,461,300 B2
(45) Date of Patent: Oct. 4, 2022

(54) DYNAMIC MODEL SERVER FOR MULTI-MODEL MACHINE LEARNING INFERENCE SERVICES

(71) Applicant: SAP SE, Walldorf (DE)

(72) Inventor: Sasmito Adibowo, Singapore (SG)

(73) Assignee: SAP SE, Walldorf (DE)

( * ) Notice: Subject to any disclaimer, the term of this patent is extended or adjusted under 35 U.S.C. 154(b) by 141 days.

(21) Appl. No.: 17/142,407

(22) Filed: Jan. 6, 2021

(65) Prior Publication Data
US 2022/0215008 A1    Jul. 7, 2022

(51) Int. Cl.
| G06F 16/00 | (2019.01) |
| G06F 16/22 | (2019.01) |
| G06F 16/242 | (2019.01) |
| G06F 9/54 | (2006.01) |
| G06F 12/0802 | (2016.01) |
| G06N 20/00 | (2019.01) |

(52) U.S. Cl.
CPC .......... *G06F 16/2255* (2019.01); *G06F 9/541* (2013.01); *G06F 12/0802* (2013.01); *G06F 16/244* (2019.01); *G06N 20/00* (2019.01); *G06F 2212/1021* (2013.01)

(58) Field of Classification Search
CPC .. G06F 16/2255; G06F 9/541; G06F 12/0802; G06F 16/244; G06F 2212/1021; G06N 20/00
See application file for complete search history.

(56) References Cited

U.S. PATENT DOCUMENTS

| 7,849,045 | B2 * | 12/2010 | Herrera | G06N 5/046 |
| | | | | 706/47 |
| 10,484,174 | B1 * | 11/2019 | Bernat | H04L 67/10 |
| 10,936,191 | B1 * | 3/2021 | Lakshminarayanan | |
| | | | | G06F 3/067 |
| 11,120,361 | B1 * | 9/2021 | Januschowski | G06N 3/084 |
| 11,348,160 | B1 * | 5/2022 | Shukla | G06K 9/6215 |
| 11,386,388 | B2 * | 7/2022 | Dhonde | G06Q 10/107 |
| 2003/0084056 | A1 * | 5/2003 | DeAnna | G06F 9/465 |
| 2016/0247175 | A1 * | 8/2016 | Milton | H04W 4/029 |
| 2017/0371926 | A1 * | 12/2017 | Shiran | G06F 16/24524 |
| 2018/0288182 | A1 * | 10/2018 | Tong | G06V 20/597 |

(Continued)

OTHER PUBLICATIONS

Docs.cloudfoundry.org [online], "HTTP Routing: Session Affinity" Aug. 2020, [retrieved on Mar. 9, 2021], retrieved from: URL <https://docs.cloudfoundry.org/concepts/http-routing.html#sessions>, 6 pages.

(Continued)

*Primary Examiner* — Noosha Arjomandi
(74) *Attorney, Agent, or Firm* — Fish & Richardson P.C.

(57) ABSTRACT

Implementations include receiving, by an application programming interface (API) server of a plurality of API servers, a prediction request from a client system, each of the plurality of API servers including a stateless server, selecting, by the API server, a model server from a plurality of model servers based on the prediction request, each of the plurality of model servers including a stateful server, calling, by the API server, the model server to execute inference using a ML model loaded to memory of the model server, receiving, by the API server, an inference result from the ML model, and sending, by the API server, the inference result to the client system.

17 Claims, 7 Drawing Sheets

(56) References Cited

U.S. PATENT DOCUMENTS

| | | | | |
|---|---|---|---|---|
| 2019/0130216 | A1* | 5/2019 | Tomioka | G06K 9/6256 |
| 2020/0333767 | A1* | 10/2020 | Engelstein | H04Q 9/00 |
| 2020/0394566 | A1* | 12/2020 | Martín | G06F 16/211 |
| 2021/0144517 | A1* | 5/2021 | Guim Bernat | G06F 9/4881 |
| 2021/0216872 | A1* | 7/2021 | Kurtz | G06N 3/084 |
| 2021/0326058 | A1* | 10/2021 | Lee | G06F 3/0632 |
| 2021/0334253 | A1* | 10/2021 | Darji | G06F 3/0604 |
| 2021/0365445 | A1* | 11/2021 | Robell | G06F 16/90 |
| 2022/0180178 | A1* | 6/2022 | Tasinga | G06F 11/3447 |
| 2022/0215008 | A1* | 7/2022 | Adibowo | G06F 16/244 |

OTHER PUBLICATIONS

Docs.microsoft.com [online], "Deploy Models with Azure Machine Learning" Jul. 2020, [retrieved on Mar. 9, 2021], retrieved from: URL <https://docs.microsoft.com/en-us/azure/machine-learning/how-to-deploy-and-where?tabs=azcli#deploy-your-model>, 12 pages.

Docs.openshift.com [online], "Routes: Sticky Session" Sep. 2017, [retrieved on Mar. 9, 2021], retrieved from: URL <https://docs.openshift.com/container-platform/3.6/architecture/networking/routes.html#routes-sticky-sessions>, 32 pages.

Engineering.grab.com [online], "Catwalk: Serving Machine Learning Models at Scale" Jul. 2019, [retrieved on Mar. 9, 2021], retrieved from: URL <https://engineering.grab.com/catwalk-serving-machine-learning-models-at-scale>, 11 pages.

Tensorflow.org [online], "TensorFlow Serving Architecture" Aug. 2020, [retrieved on Mar. 9, 2021], retrieved from: URL <https://www.tensorflow.org/tfx/serving/architecture>, 7 pages.

Towardsdatascience.com [online], "Strategies for Productionizing our Machine Learning Models" Mar. 2019, [retrieved on Mar. 9, 2021], retrieved from: URL <https://towardsdatascience.com/strategies-for-productionizing-our-machine-learning-models-53399a3199da>, 11 pages.

Wikipedia.org [online], "HTTP cookie" Nov. 2001, [retrieved on Mar. 9, 2021], retrieved from: URL <https://en.wikipedia.org/wiki/HTTP_cookie>, 26 pages.

* cited by examiner

DYNAMIC MODEL SERVER FOR MULTI-MODEL MACHINE LEARNING INFERENCE SERVICES

BACKGROUND

For vendors of cloud computing services, providing machine learning (ML) inference services for heterogeneous customers at-scale is challenging. In detail, customers require their own ML models to make predictions for their respective problem domains. For example, ML models can be configured in the respective artificial neural networks (ANN) in order to solve a certain well-defined problem. Because the customers would have their specific set of problems to solve, the ML model of one customer might not be able to solve problem of another customer.

In general, ML models can be described as large binary objects (referred to herein as ML objects). The size of these ML objects (e.g., at least a few hundred megabytes (MB) each) is a primary challenge in providing ML inference services at-scale in a cloud environment. The ML objects would need to be downloaded from a persistent storage service, extracted, de-serialized, and loaded into memory in order to re-construct an ANN, for example, and prepare the ANN to make inferences. Ideally, the server system of the cloud environment would be better to keep ML models loaded in memory to provide good performance and user experience.

However, keeping ML models loaded in memory is not scalable. Computing resources of the server system are finite and the server system could hold only a limited number of ML models before running out of memory. Notwithstanding, and even in cloud environments where new servers can be provisioned within minutes, keeping the ML models loaded in memory incurs running costs. For example, virtual servers are often billed by the execution time. If the vendor of cloud computing services charges customers by the number of the inferences, the vendor would need to pay the running costs of idle servers that hosts unused ML models before the customers actually start to use the ML models.

In one aspect, usage of ML models can be compared to a user session in the context of web servers. For example, ML models and context of web servers are both data that needs to be loaded in memory of the server system to serve requests for a particular client. Without loading the data, the server is not able to respond to the request and perform appropriate computations. Nevertheless, the data is unique for the client. Unfortunately, existing technologies to manage user sessions are optimized for small amounts of data that are simple to serialize or de-serialize. Moreover, web session storage technologies need not address the issue of loading large amounts of data into memory. Therefore, the ML models cannot be treated the same way as a web user session would, due to size and complexity of the ML models.

SUMMARY

Implementations of the present disclosure are directed to a cloud-based machine learning (ML) inference platform for large scale, multi-model ML inference services. More particularly, implementations of the present disclosure are directed to a cloud-based ML inference platform that provides, among other features, network application programming interface (API) services for performance of ML inference using heterogeneous ML models to serve heterogenous client systems.

In some implementations, actions include receiving, by an API server of a plurality of API servers, a prediction request from a client system, each of the plurality of API servers including a stateless server, selecting, by the API server, a model server from a plurality of model servers based on the prediction request, each of the plurality of model servers including a stateful server, calling, by the API server, the model server to execute inference using a ML model loaded to memory of the model server, receiving, by the API server, an inference result from the ML model, and sending, by the API server, the inference result to the client system. Other implementations of this aspect include corresponding systems, apparatus, and computer programs, configured to perform the actions of the methods, encoded on computer storage devices.

These and other implementations can each optionally include one or more of the following features: selecting a model server includes providing a list of model servers indicating one or more model servers that are currently deployed, calculating a hash value for each model server in the list of model servers, sorting the list of model servers based on hash values to provide a sorted list, and selecting the model server based on the sorted list; each hash value is calculated based on a concatenation of a node identifier of a respective model server and a model identifier of the ML model; actions further include determining, by the model server, that the ML model is loaded in memory, and in response, incrementing a cache hit; actions further include determining, by the model server, that the ML model is not loaded in memory, and in response incrementing a cache miss, retrieving the ML model from a model storage, and loading the ML model to the memory of the model server; actions further include periodically calculating a ratio based on a number of cache hits and a number of cache misses, and adjusting a number of model servers in the plurality of model servers based on the ratio; and at least one of a maximum number of model servers and a minimum number of model servers is determined based on the ratio, and the number of model servers is adjusted based on the maximum number of model servers and the minimum number of model servers.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are directed to a cloud-based machine learning (ML) inference platform for large scale, multi-model ML inference services. More particularly, implementations of the present disclosure are directed to a cloud-based ML inference platform that provides, among other features, network application programming interface (API) services for performance of ML inference using heterogeneous ML models to serve heterogenous client systems.

Implementations can include actions of receiving, by an API server of a plurality of API servers, a prediction request from a client system, each of the plurality of API servers including a stateless server, selecting, by the API server, a model server from a plurality of model servers based on the prediction request, each of the plurality of model servers including a stateful server, calling, by the API server, the model server to execute inference using a ML model loaded to memory of the model server, receiving, by the API server, an inference result from the ML model, and sending, by the API server, the inference result to the client system.

Figure 1:
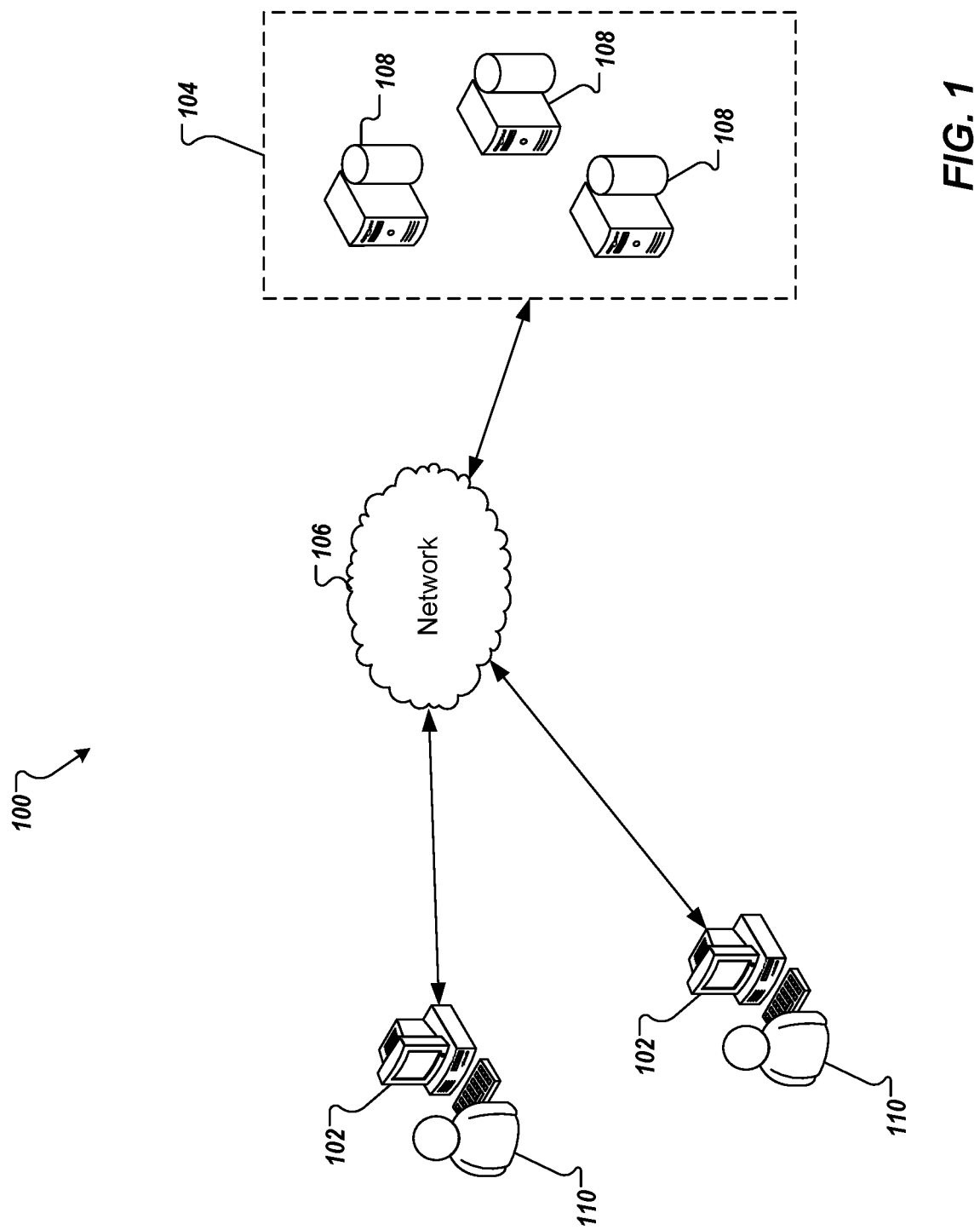
FIG. 1 depicts an example architecture that can be used to execute implementations of the present disclosure.

FIG. 1 depicts an example architecture 100 in accordance with implementations of the present disclosure. In the depicted example, the example architecture 100 includes one or more client devices 102, a server system 104 and a network 106. The server system 104 includes one or more server devices 108. In the depicted example, respective users 110 interact with the client devices 102. In an example context, a user 110 can include a user, who interacts with an application that is hosted by the server system 104. In another example context, a user 110 can include a user, who interacts with the server system 104 for performance of inference using one or more ML models, described in further detail herein.

In some examples, the client devices 102 can communicate with one or more of the server devices 108 over the network 106. In some examples, the client device 102 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices.

In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, each server device 108 includes at least one server and at least one data store. In the example of FIG. 1, the server devices 108 are intended to represent various forms of servers including, but not limited to a web server, an application server, a proxy server, a network server, and/or a server pool. In general, server systems accept requests for application services and provides such services to any number of client devices (e.g., the client devices 102) over the network 106.

In some implementations, one or more data stores of the server system 104 store one or more databases. In some examples, a database can be provided as an in-memory database. In some examples, an in-memory database is a database management system that uses main memory for data storage. In some examples, main memory includes random access memory (RAM) that communicates with one or more processors (e.g., central processing units (CPUs)), over a memory bus. An-memory database can be contrasted with database management systems that employ a disk storage mechanism. In some examples, in-memory databases are faster than disk storage databases, because internal optimization algorithms can be simpler and execute fewer CPU instructions (e.g., require less CPU consumption). In some examples, accessing data in an in-memory database eliminates seek time when querying the data, which provides faster and more predictable performance than disk-storage databases.

Implementations of the present disclosure are described in further detail herein with reference to an example context. The example context includes applications that are executed on a client-server architecture, such as the example architecture 100 of FIG. 1. In some examples, applications can be provided in a suite that includes two or more applications. Example applications can include an enterprise resource planning (ERP) application, a customer relationship management (CRM) application, a supply chain management (SCM) application, and a product lifecycle management (PLM) application. It is contemplated, however, that implementations of the present disclosure can be realized in any appropriate context (e.g., healthcare applications).

Referring again to FIG. 1, and in the example context, one or more applications can be hosted by the server system 104. A user 110 can interact with an application using the client device 102. More specifically, a session can be established between the client device 102 and one or more server devices 108, during which session the user 110 is able to interact with one or more applications hosted on the server system 104. The one or more applications can enable the user to interact with data stored in one or more databases. In some examples, interactions can result in data being stored to the database, deleted from the database, and/or edited within the database.

In some implementations of the present disclosure, applications hosted on the server system 104 can include inferences services using ML models. For example, inference requests can be sent to the ML inference service hosted by the server system 104. In some examples, the server system 104 hosts multiple, disparate ML models. For example, ML models can be generated and/or trained with different data or trained for different purposes or clients. The ML models can be stored in the data store of the server system 104 and loaded into memory when receiving a prediction request corresponding to the ML model. In some examples, the ML models are loaded from the data store to the memory based on a management mechanism of the server system 104. In some example, the management mechanism can be operated by the server system 104 based on the resources and prediction of user request.

In some examples, when the server system 104 receives an inference request, the server system 104 selects a ML model in response to the inference request. The selection can be made based on the identity of the user 110 (e.g., the enterprise or company that the user is belonged) or the type of inference request (e.g., semantic inference, image recognition, data analysis).

As introduced above, implementations of the present disclosure provide a cloud-based ML inference platform (also referred to herein as inference platform) that is readily scalable to provide inference services using multiple, disparate ML models. For example, the inference platform of the present disclosure is at least partially hosted in the server system 104. As described in further detail herein, the inference platform is able to provide client-specific inference services using client-specific and request-specific ML models (e.g., selecting a ML model specific to the client and/or the request). As also described in further detail herein, the inference platform execute functionality unconstrained by the size and complexity of the ML models. In some implementations, the inference platform is able to dynamically adjust a number of servers in use for ML model inference to balance user experience and service cost.

Figure 2:
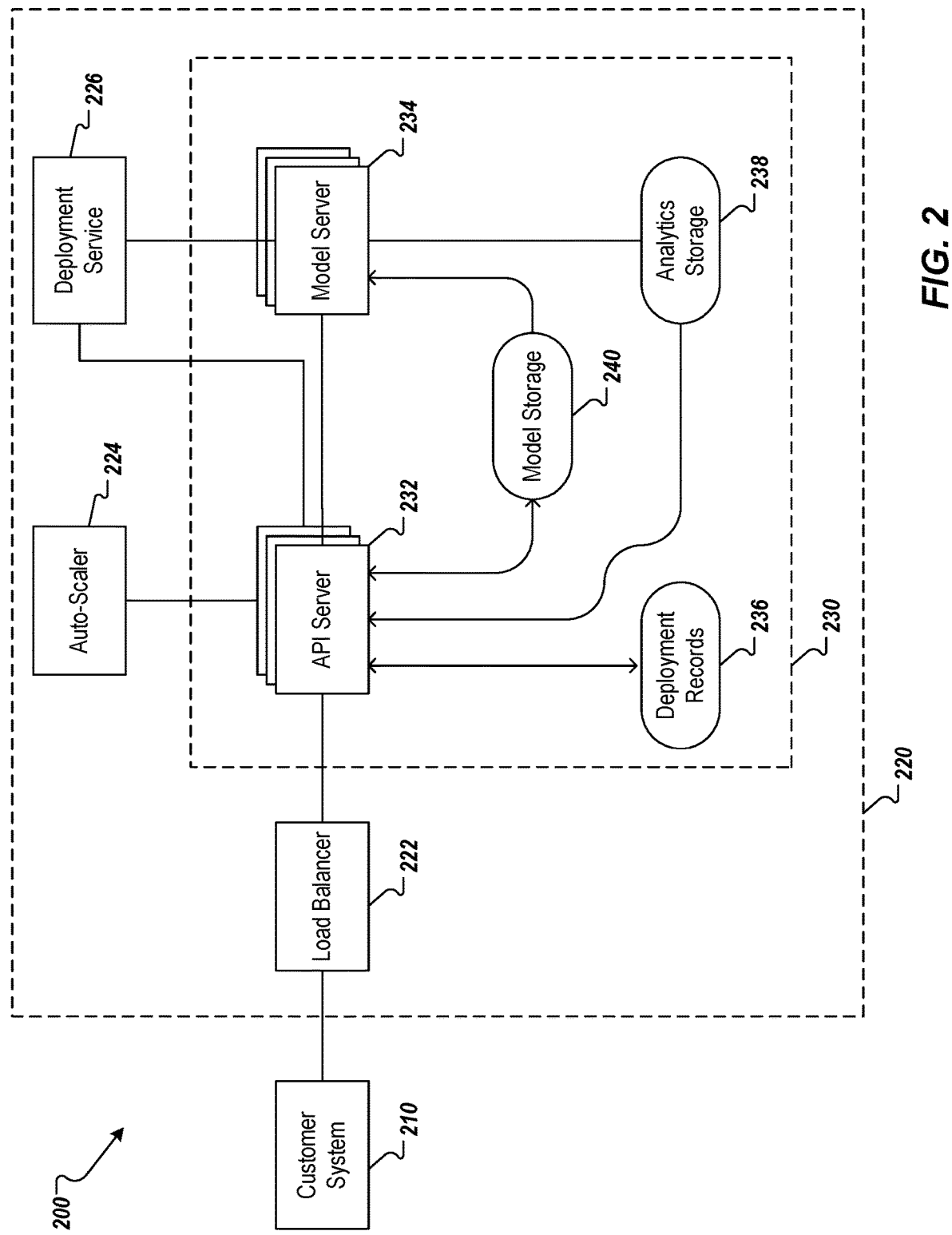
FIG. 2 schematically depicts at least a portion of a cloud-based machine learning (ML) inference platform in accordance with implementations of the present disclosure.

FIG. 2 schematically depicts at least a portion of an inference platform 200 in accordance with implementations of the present disclosure. In the example of FIG. 2, a customer system 210 communicates with a server system 220 (e.g., over a network, such as the network 106 of FIG. 1). The customer system 210 transmits inference requests to and receives responses from the server system 220. That is, and as described in further detail herein, the server system 220 executes inference services executed in accordance with implementations of the present disclosure.

In further detail, the server system 220 includes a load balancer 222, an auto-scaler 224, a deployment service 226, and a ML serving system 230. In some examples, the ML serving system 230 includes a set of API servers 232, a set of model servers 234, deployment records 236, analytics storage 238, and model storage 240. In some implementations, the API servers 232 are configured as a set of stateless nodes and the model servers 234 are configured as a set of stateful nodes. The stateless API servers 232 serve network requests (e.g., the inference requests) from customer system 210 and the stateful model servers 234 execute ML inferences in response to requests.

In some examples, the network API services (e.g., representational state transfer (REST)). The stateless API servers 232 can be executed as a 12-factor application in a platform-as-a-service (PaaS) environment (e.g., the ML serving system 230). In some examples, the ML serving system 230 can be provided using Heroku or Cloud Foundry. Because, the API servers 232 are each configured as stateless servers, the load balancer 222 is provided in the server system 220 to balance requests from customer systems 210 to each of the API servers 232 to avoid overloading particular API servers 232 relative to other API servers 232.

In accordance with implementations of the present disclosure, the (stateless) API servers 232 can each execute a custom node selection to determine which (stateful) model server 234 is chosen to perform inference service in response to an inference request. In some examples, the custom node selection is configured to maximize locality of references and therefore minimize the technical overhead that the server system 220 needs to load or unload the ML models to/from memory. The (stateful) model servers 234 can load the ML models as required by the request and perform inferences using these ML models sequentially. In some examples, a ML model that is being used (referred to herein as an in-use ML model) is kept in memory (which follows the stateful designation) until the time that the model server 234 needs to load another ML model. In some examples, the model servers 234 execute a least-recently-used (LRU) replacement algorithm to manage replacement of ML models. In the context of the present disclosure, the LRU replacement algorithm is executed to replace an in-use ML model that has not been used for the longest period of time relative to other in-use ML models.

In some implementations, the combination of LRU replacement algorithm used in the (stateful) model server 234 and the custom node selection executed in the (stateless) API server 232 optimizes the server system 230 in provisioning ML inference services using heterogeneous ML models to heterogeneous clients. Further, the inference services are provided in real-time. As used herein, real-time, real time, realtime, real (fast) time (RFT), near(ly) real-time (NRT), quasi real-time, or similar terms (as understood by one of ordinary skill in the art) mean that an action and a response are temporally proximate, such that an individual perceives the action and the response occurring substantially simultaneously. For example, the time difference for an inference result to provided following action to issue an inference request may be less than 1 ms, less than 1 sec., less than 5 secs., etc. While the requested inference need not be executed instantaneously, it is executed without any intentional delay, taking into account processing limitations of a described computing system and time required to, for example, gather, accurately measure, analyze, process, store, or transmit (or a combination of these or other functions) the ML model and data to be processed therethrough.

In some examples, the (stateful) model servers 234 are provided as a collection of application containers or virtual machines that are deployed or un-deployed using container-orchestration technologies (e.g., Kubernetes, Amazon EC2). Each model server 234 (also referred to as a stateful node) is placed in an independent computing unit (e.g., container) with its own network address (e.g., host name and/or IP address). The software in each container should be identical to each other as defined by the software system. Because the model servers 234 can managed by the ML serving system 230 in the server system 220, the deployment and un-deployment of model servers 234 is quicker than requesting a physical server within a data center. In some examples, the ML serving system 230 creates or destroys a model server 234 based on a usage pattern of a respective customer. In some examples, the LRU replacement algorithm can ensure that there are enough model servers 234 to adequately serve customers, while preventing the ML serving system 230 from running too many nodes and incur unnecessary costs.

In some implementations, the model storage 240 is configured to store the ML models and can be accessed by each of the API servers 232 and the model servers 234. In some examples, the model storage 240 can be implemented using any appropriate technology (e.g., Amazon S3, a shared folder). In some implementations, the analytics storage 238 is configured to store usage patterns of customer systems 210, which are accessed shared by the API servers and the model server 234. In some examples, the analytics storage 235 can be implemented as a database table or storage with similar structures. In some implementations, the deployment records 236 are configured to record the deployment of each of the model servers 234, such as a record for deployment of each model server 234 and expected operating state of each model server 234.

In some implementations, the auto scaler 224 is configured to adjust the number of the API servers 232 based on an average load of the API servers 232. In some examples, the average load of the API servers 232 can be determined based on a load computation of each API server 232 and/or network response latency of each API server 232. In some implementations, the deployment service 226 is used or called by the API server(s) 232 to request an instance of a model server 234 or remove/destroy an instance of a model server 234. In other words, the deployment service 226 can be called by the API server(s) 232 to manage the deployment and un-deployment of model servers 234.

In accordance with implementations of the present disclosure, the model servers 234 perform ML inferences in response to inference requests. In some examples, each inference request includes data that is to be processed for inferencing (e.g., input to the ML model) and an indication of the ML model that is to be used (e.g., ML model that is trained for the particular type of data). For example, and without limitation, the data can be a block of text provided from a customer system 210 and the corresponding inferences can be whether the text is about a technical support request or a feature request. In this example, the customer can define what categories that the text could be. Also, the customer can train one or more ML models for the request based on historical data, for example, some already-categorized sample texts, and use the ML model to classify and predict the above-mentioned blocks of texts without needing human intervention.

Figure 3:
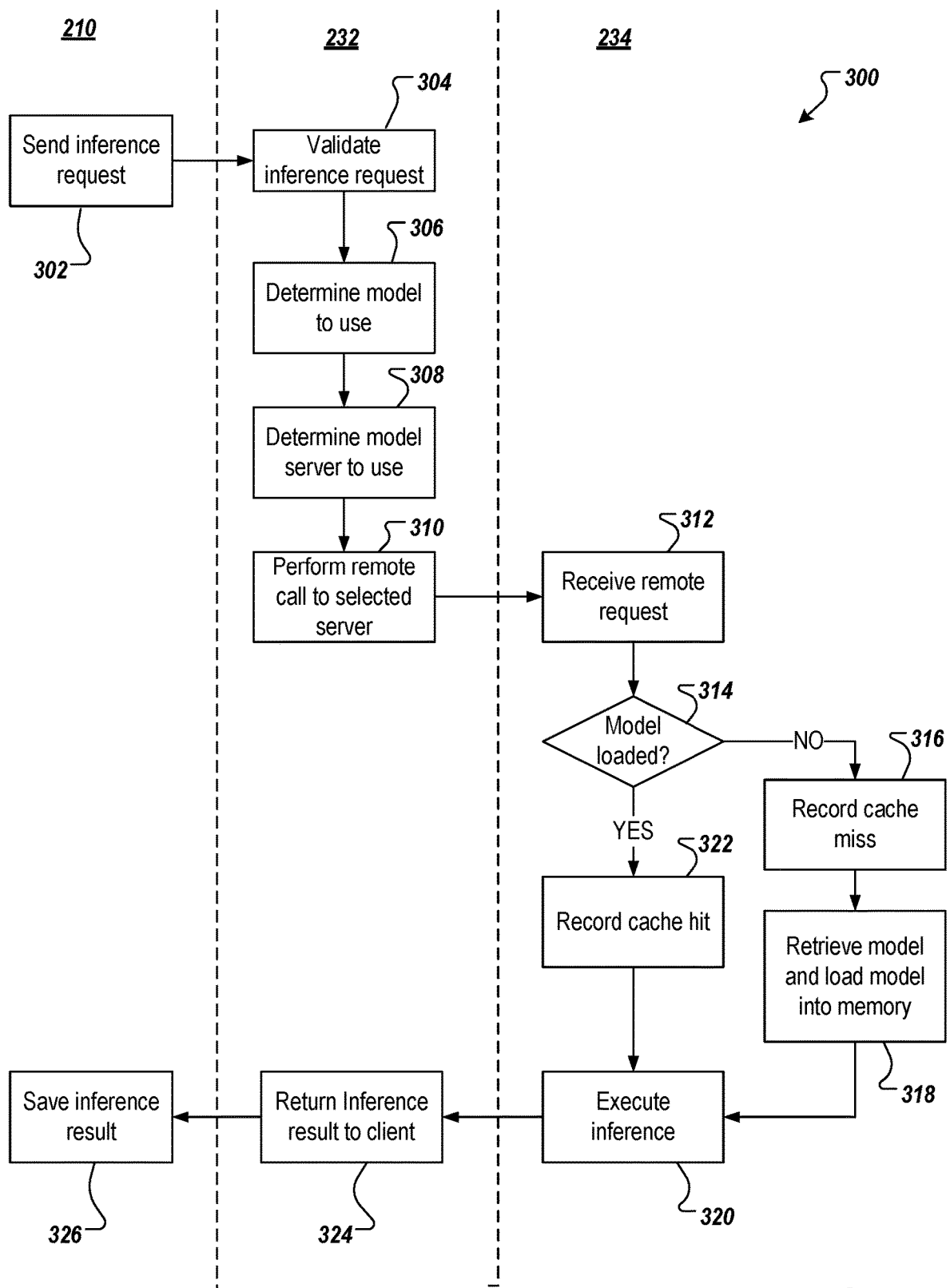
FIG. 3 schematically depicts an example ML model inference flow in accordance with implementations of the present disclosure.

FIG. 3 schematically depicts an example ML model inference process 300 in accordance with implementations of the present disclosure. In the example of FIG. 3, a customer system 210, an API servers 232 and a model server 234 (of FIG. 2) interact to execute the process 300. An inference request is sent (302). For example, the customer system 210 sends the inference request to the server system 220. The prediction request can include the data that is to be processed for inference by a ML model. The inference request is received and is validated (304). For example, the API server 232 receives the inference request (e.g., through the distribution of the load balancer 222) and executes validation. In some examples, an inference request is determined to be valid, if the inference request is received from a customer system 210 that is authorized to submit inference requests, and/or the a format and/or attributes of the inference request are determined to be valid.

Example attributes that can be referenced to check the inference request for validity can include, without limitation, transport format (e.g., if the REST API expects JSON, but the customer system sends XML, then the format is incorrect and an error is flagged), data semantics (e.g., if the ML model expects three two text fields named "Subject" and "Body," but the customer system 210 sends only one text field named as "Contents," an error is flagged), data size (e.g., limits imposed to protect the system from overloading or from deliberate attacks; if a service agreement was to provide inference services for a maximum of one 1 MB per request, but the customer system 210 sends a larger request, the request is rejected by the API Server without incurring a load to any model server node).

An ML model that is to be used for inference is determined (306). For example, the API server 232 determines which ML model, among available ML models in the model storage 240, is to be used for inference. In some examples, the identification can be made based on language, object type, and various other attributes of the inference data. Selection of the ML model is described in further detail below with reference to non-limiting examples.

In one example, the ML system can be provisioned as a text classifier that is used to automatically determine kinds of free-form text as part of a customer service environment. An example customer can have four major sources of text that is to be classified, for example, Twitter that mentions the product or directly tags the company's official account (typical short-form text 280 characters or less), Facebook posts to the company's official page (ranging from a few characters up to about 1 KB of text, from e-mail sent to the company's official support address, and from the web, posted through the company's official web form. People employ different styles of writing for the respective channels. For example, Twitter posts are very constrained, Facebook posts are less constrained in length, yet e-mail has almost no length constraints at all and may even include images, video, or even voice attachments. These differing constraints propels "sub-languages," even when the core language is the same (e.g., English). Further, the fields are different for each channel. Posts coming from Twitter and Facebook would likely have two text fields, "Content" (the post's text) and "Sender" (the social media account or name of the poster). An e-mail would also have "Subject" in addition to "Content" and "Sender." The company's web form can require further structured data, which may include the particular product or services that the text is about. All of these types of channels would need to be serviced from their respective ML models, which are trained separately to cater for the differences. A "twitter" model would have two text fields as input whereas a "web form" model would have the input fields that mirror the corresponding web form in the company's site, and similarly for each channel that the company supports. Further, the text's human language (e.g., English, French, Chinese), which would require their respective training data set and ML models respectively.

In view of this, for the particular customer, the separate ML models would need to be trained for each combination of the "channel" (Twitter, Facebook, etc.) and "language" (English, Chinese, etc.). Similarly, in the call coming to the API server, the customer system can indicate the data source for a particular prediction call (e.g., a REST call to the API server can indicate that the text came from Twitter, and provide the Sender and Content fields, to request an inference of the category and priority of the item). In turn, the API server would pick the Twitter model and map the fields as given in the call into the input to the ML model. Likewise, the API server can optionally detect the language of the text as part of the model-selection process, or a language could be specified in the REST call.

Another example of selection criteria is the ML model's activation status. An "active" model simply means "use this for inference" whereas an inactive one means "do not use this for inference." In this setup, the inference system would only use the "active" models to make predictions and completely disregard the inactive models. Similarly, customers can activate/de-activate models at will. In some examples, the customer can have a new data set and has trained an ML model from the new data set. This new ML model could be better than the old ML model, or could be worse. Therefore, the customer can choose to "activate" the new ML model, but keep the old one in an inactive state. If it turns out that the new ML model perform worse than the old one (less accuracy, more biased, makes inferences having ESG problems, etc.), then the customer can re-activate the old ML model. This can be achieved without needing to re-create the old ML model by re-training using the old data set. This activation/de-activation actions would only take seconds (even less) to perform at practically zero cost, unlike training a model which could take hours and incur significant computing costs.

A model server to be used for inference is determined (308). For example, the API server 232 can determines which model server 234 is to perform the inference in response to the inference request. A remote call is executed to the model server (310). For example, the API server 232 makes a network call to the model server 234 to perform the inference. In some examples, the network call to the model server 234 can include a ML model identifier of the identified ML model along with the inference data. The ML model identifier can be used to determine whether the ML model is already loaded in memory or is located within the model storage 240.

The network call is received (312). For example, the model server 234 receives the network call and the information regarding the inference request and selected ML model. It is determined whether the ML model is loaded (314). For example, the model server 234 determines whether the identified ML model is already loaded in memory. If the ML model is not loaded in memory, a cache miss is recorded (316), the ML model is retrieved (e.g., from the model storage 240) and is loaded into memory (318), and inference is executed (322). In some examples, if the memory is full, the model server 234 can unload one or more in-use ML models that are not recently used based on the LRU replacement algorithm, described herein. If the ML model is loaded in memory, a cache hit is recorded and inference is executed (322). In some examples, a ratio of cache hits to cache misses can be used for managing the number of model servers 234 that are instantiated, as described in further detail herein. In some examples, inference execution includes providing data of the inference request as input to the ML model loaded in the model server 234, which processes the data to provide an inference result. The inference result is returned to the client (324) and is stored in the client (326).

With regard to selection of the model server, implementations of the present disclosure provides for selection of the same model server node for inference that calls for a particular ML model in combination with LRU caching within each node. In this manner, the LRU cache within a node would be effective. As described in further detail herein, routing of the present disclosure is achieved by hashing a combination of the node's identity (i.e., deployment identifier) with the ML model's identity and then ordering the hashed combination. The node selection order is stable, given a fixed set of node deployments, as a consequence of properties of hash algorithms. In accordance with implementations of the present disclosure, inferences that need a particular ML model will be directed to a particular node. Unless of course, if that node is malfunctioning or does not respond properly (e.g., too busy). In such cases, a designated secondary node is provided as a consequence of ordering of the hash values. Similarly, if that secondary node did not respond, then there would be a designated tertiary node, and so on. This ordering is fixed as long as the pool of nodes is made constant (no new nodes are added into the pool and no existing nodes are removed). In turn, this fixed set of ordering makes effective use of the LRU cache within a node.

Figure 4:
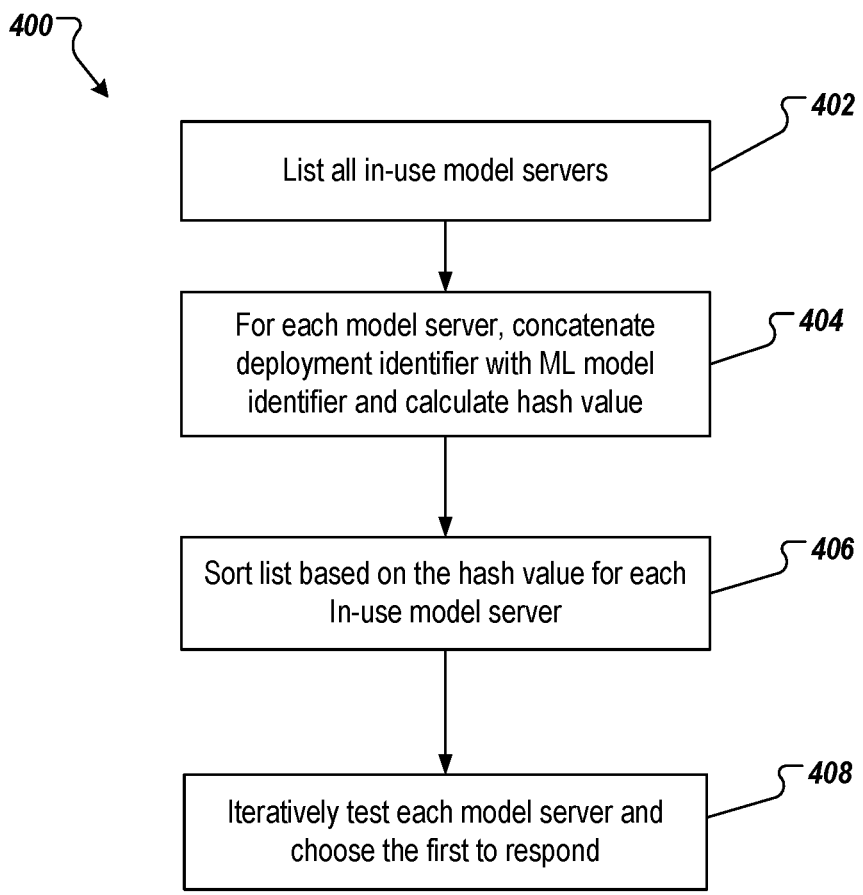
FIG. 4 schematically depict an example process of server selection in accordance with implementations of the present disclosure.

FIG. 4 schematically depict an example process 400 for model server selection in accordance with implementations of the present disclosure. In some examples, the API server 232 can execute the process 400 to determine the model server 234 that is to be used to execute inference (e.g., 308 of FIG. 3). In general, the example process 400 of FIG. 4 provides for model server selection that maximizes the LRU cache of the selected model server and provide a transparent failover between model servers. It is noted that the failover mentioned herein is directed to a situation that the selected node (model server) is unable to respond and the API server 232 has to re-select for an appropriate substitution. In some examples, the selection can be based on hashing a combination of model server identifier and the ML model identifier and ordering the model servers based on respective hash values. In this manner, the inference request for a particular ML model would more frequently be sent to the same model server 234.

A list of all in-use model servers is provided (402). For example, the API server 232 maintains a list of all in-use model servers 234 based on the data stored in the deployment records 236. That is, the model servers 234 in the list are currently deployed and are able to respond quickly. A hash value for each model server in the list is calculated (404). The hash values are calculated using any appropriate hash function (e.g., secure hash algorithm (SHA) 1 (SHA-1)). In some examples, for each model server 324, the hash value is determined by a concatenating the respective node identifier and the model identifier, and processing the concatenation through the hash function. In this manner, a list of hash values is provided, each hash value corresponding to an in-use model server. The list of in-use model servers is sorted (406). For example, sorting can be based on the hash values (e.g., rank order highest to lowest or lowest to highest). The in-use model servers are tested (408). For example, the API server 232 can iteratively test each model server 234 based on the order in the list. Testing can include transmitting a request to a model server and waiting for a response within a predetermined period of time. If a response is not received within the predetermined period of time, the API server 232 sends a request to the next model server in the (ordered) list. The API server 232 selects the model server 234 that responds first.

In some examples, the process for selecting a model server (e.g., the process 400 of FIG. 4) can be expressed by a single structured query language (SQL) statement (e.g., the deployment records 236 are stored in a SQL database table). The following is an example PostgreSQL statement that returns an ordered list of model servers 234 to be used as candidates for the prediction. It is noted that the "in_use" attribute mentioned herein represents that the corresponding model server 234 referenced by the record is deployed and functioning.

```
SELECT
    a.*
FROM
    deployment_record a
WHERE
    a.in_use=true
ORDER BY
```

```
           DIGEST (
              CONCAT (
                 :tenant_id,
                 :model_id,
                 a.deployment_id
              ),
              'sha1'
           )
```

Example PostgreSQL Statement for Order List Representative of In-Use Model Servers The above example statement retrieves parameters, "deployment_id," "tenant_id," and "model_id." The parameter "deployment_id" is a value that uniquely identifies each model server 234 in the server system 220. The parameter "tenant_id" is a value that uniquely identifies the customer. The parameter "model_id" is a value that uniquely identifies the ML model that is to be used. In some examples, if the value of "model_id" is unique across all customers (for example, a UUID), then the value of "tenant_id" becomes optional for inclusion in the SQL statement. In this example, the SQL function "DIGEST" creates a SHA-1 hash value calculated from the concatenation of parameters "tenant_id," "model_id," and "deployment_id."

From another aspect, in a typical PaaS environment, model servers are charged by the platform (e.g., the server system 220) by the length of execution duration. Therefore, it would be costly to keep too many model servers in-use. Conversely, too few model servers imply frequent cache misses, which would lead to delay in returning inference results to customer systems, because the ML models need to be retrieved from the model storage and loaded into memory. Such delays represent a general degradation of service. In accordance with implementations of the present disclosure, the server system 220 dynamically manages the number of in-use model servers 234. If there are too many cache misses, then the server system 220 deploys new model servers 234. If there are no cache misses and a utilization rate of the model servers is low, then the server system 220 would reduce the number of model servers. It can be noted that, if there are no cache misses, then it is presumed that the utilization of model servers (the pool as a whole) is too low. In other words, no cache misses means that no ML model has been unloaded (e.g., by a node's LRU cache), which means all model server nodes would have all models in-memory. This can indicate that the node LRU cache is not full and too many nodes and likely been deployed in the first place.

Figure 5A:
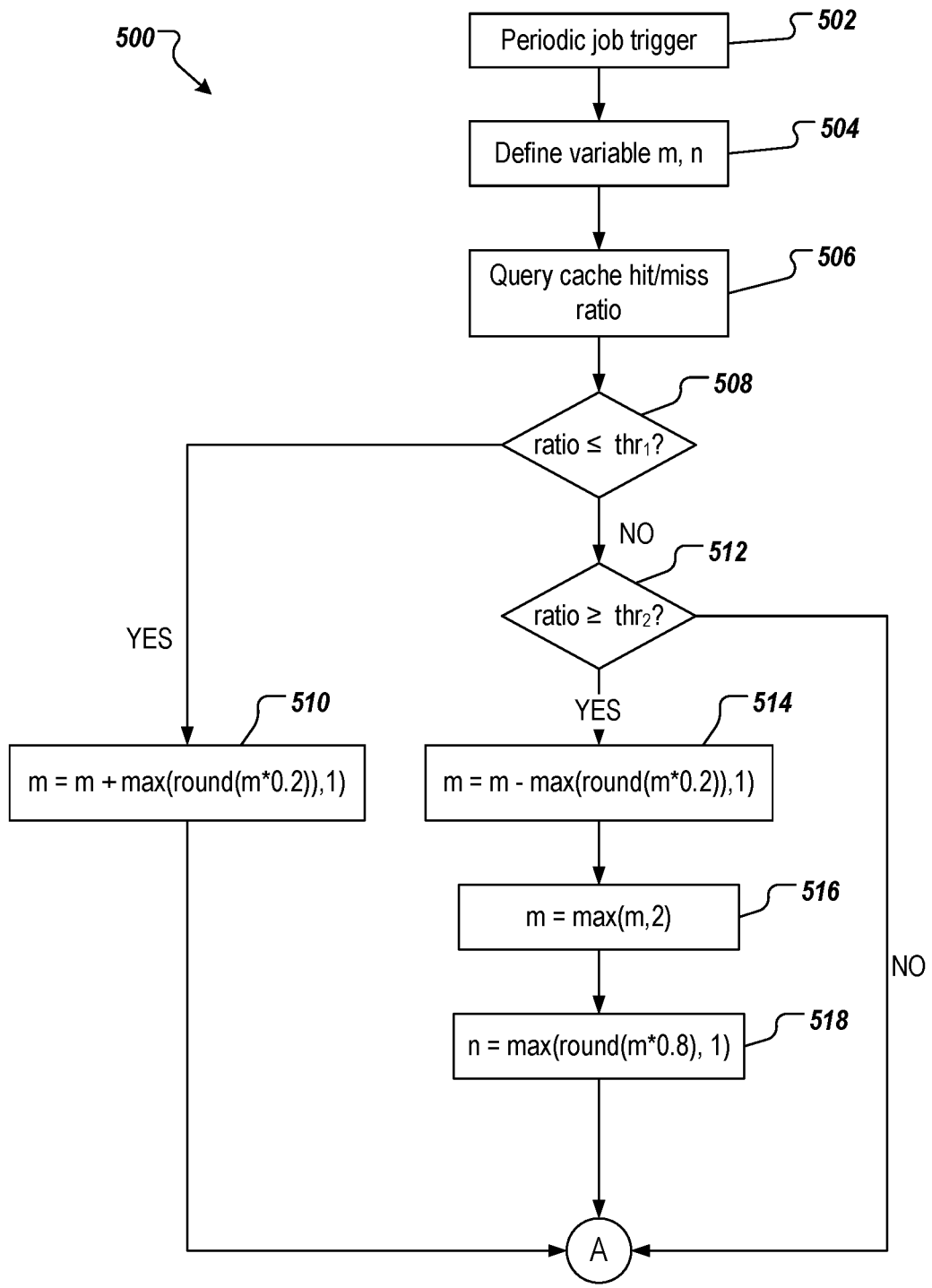
FIGS. 5A and 5B depict an example process for deployment management of server systems for ML inference services that can be executed in accordance with implementations of the present disclosure.
Figure 5B:
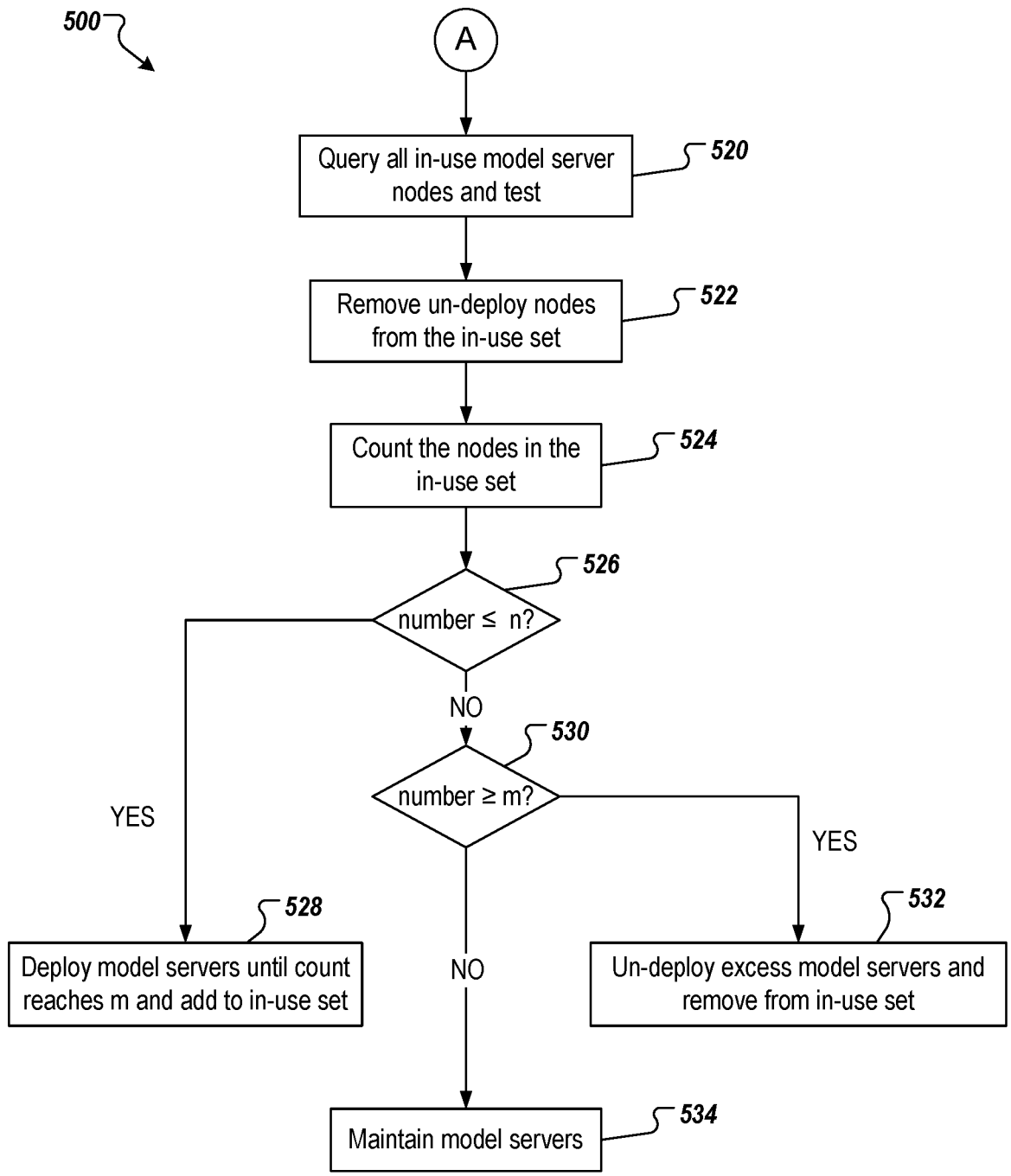

FIGS. 5A and 5B depicts an example process 500 for deployment management of the model servers that can be executed in accordance with implementations of the present disclosure. The example process 500 depicted in FIGS. 5A and 5B can be executed by components in the server system 220. In the example of FIGS. 5A and 5B, the number of model servers 234 can be dynamically adjusted based on the usage from user and cost-effective consideration.

Adjusting the number of model servers is initiated in response to a periodical job trigger (502). In some examples, the process 500 can be triggered daily as part of regular maintenance tasks for the server system 220. In some examples, the process 500 can be triggered at any appropriate interval (e.g., weekly, daily, hourly, every X minutes). Variables m and n are defined (504). In some examples, the variable m represents a maximum number of the model servers 234 that can be in-use and variable n represents a minimum number of the model servers 234 that are to be in-use. In some examples, the variables m and n are persisted as runtime configuration values in the server system 220.

A cache hit/miss ratio is queried (506). In some examples, the cache hit/miss ratio (also referred to herein as the ratio) is defined as the total number of cache hits divided by the total number of cache miss since the last execution of the deployment management process. It is noted that cache hits and cache misses are recorded as described with reference to FIG. 3. It is determined whether the ratio is less than or equal to a first threshold (508). If the ratio is less than the first threshold (e.g., 68%), then it is determined that the number of in-use model servers is insufficient. As a result, the value of m is increase by a predetermined proportion (e.g., 20% in this non-limiting example) of the current value of m (510). In the example of FIG. 5A, the number of model servers will increase by at least one, if the predetermined proportion of m is smaller than 1.

If the ratio is not less than the first threshold, it is determined whether the ratio is greater than or equal to a second threshold (512). If the ratio is not greater than or equal to the second threshold (e.g., 95%), neither of the variables m and n is updated and the example process 500 proceeds. If the ratio is greater than or equal to the second threshold, it is determined that there are too many in-use model servers. Consequently, the values of m and n are adjusted (514, 516, 518). The value of m is decreased by the predetermined proportion (e.g., 20% in this example) or 1. In this example, it is ensured that m is not smaller than 2, n is not smaller than 1 and m is bigger than n after the adjustment.

It is noted that the first threshold and/or the second threshold can be adjusted based on practical needs. Setting of the first threshold and/or the second threshold can also be adjusted periodically. In some examples, setting of the predetermined proportion can be adjusted periodically or based on practical needs.

Referring now to FIG. 5B, the in-use models servers are queried and tested (520). For example, the server system 220 (e.g., one of the API servers 232) queries the deployment record 236 for a list of all in-use model servers 234 and tests (e.g., sends a call to) the model server 234 to ensure that the record is synchronized with the real status of the model servers 234. In some examples, the test can be done by sending a network request to each model server 234 and check whether the model server 234 responds to the call with good health reported. Broken (non-responsive) in-use model servers are removed from the in-use set and the deployment records are updated (522). A number of the in-use model servers is calculated (524). It is determined whether the number of in-use model servers is less than or equal t on (526). If the number of in-use model servers is less than or equal to n, model servers are deployed until m in-use model servers is reached (528). If the number of in-use model servers is not less than or equal to n, it is determined whether the number of in-use model servers is greater than or equal to m (530). If the number of in-use model servers is greater than or equal to m, there are too many in-use model servers and excess model servers are un-deployed (532). If the number of in-use model servers is greater than or equal to m, the current number of model servers is maintained (534). In some implementations, the number of model servers is maintained to be within a range (e.g., from m and n) instead of a particular fixed integer number to prevent thrashing. In some examples, thrashing can be described as unnecessary deployment or un-deployment cycles.

In some implementations, because nodes are selected based on the hash value that includes the deployment identifier of the model server, adding or removing model servers would change selection criteria for all inferences, despite the set of identifiers of the ML models not changing. This is beneficial on automatically re-balancing of the caches (i.e., the LRU cache within each model server 234). However, changing the set too often would cause excessive re-balancing of the LRU cache within each model server 234, which would likely increase the inference response times.

Figure 6:
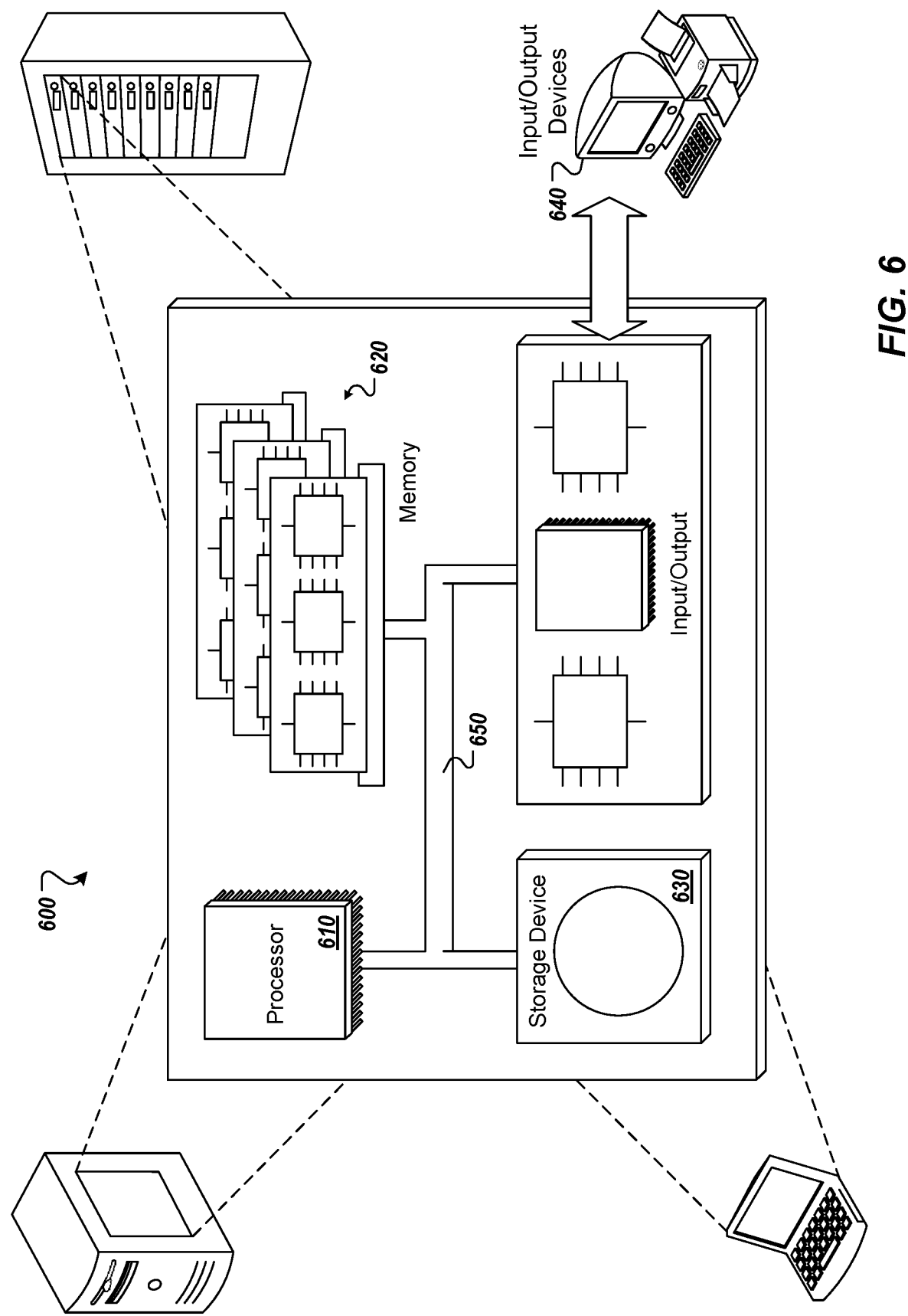
FIG. 6 is a schematic illustration of example computer systems that can be used to execute implementations of the present disclosure.

Referring now to FIG. 6, a schematic diagram of an example computing system 600 is provided. The system 600 can be used for the operations described in association with the implementations described herein. For example, the system 600 may be included in any or all of the server components discussed herein. The system 600 includes a processor 610, a memory 620, a storage device 630, and an input/output device 640. The components 610, 620, 630, 640 are interconnected using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit. The storage device 630 is capable of providing mass storage for the system 600. In one implementation, the storage device 630 is a computer-readable medium. In various different implementations, the storage device 630 may be a floppy disk device, a hard disk device, an optical disk device, or a tape device. The input/output device 640 provides input/output operations for the system 600. In one implementation, the input/output device 640 includes a keyboard and/or pointing device. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for deployment of a multi-model machine learning (ML) inference service in a cloud environment, the method comprising: receiving, by an application programming interface (API) server of a plurality of API servers, a prediction request from a client system, each of the plurality of API servers comprising a stateless server; selecting, by the API server, a model server from a plurality of model servers based on the prediction request, each of the plurality of model servers comprising a stateful server; calling, by the API server, the model server to execute inference using a ML model loaded to memory of the model server; receiving, by the API server, an inference result from the ML model; sending, by the API server, the inference result to the client system; periodically calculating a ratio based on a number of cache hits and a number of cache misses; and adjusting a number of model servers in the plurality of model servers based on the ratio.

2. The method of claim 1, wherein selecting a model server comprises: providing a list of model servers indicating one or more model servers that are currently deployed; calculating a hash value for each model server in the list of model servers; sorting the list of model servers based on hash values to provide a sorted list; and selecting the model server based on the sorted list.

3. The method of claim 2, wherein each hash value is calculated based on a concatenation of a node identifier of a respective model server and a model identifier of the ML model.

4. The method of claim 1, further comprising determining, by the model server, that the ML model is loaded in memory, and in response, incrementing a cache hit.

5. The method of claim 1, further comprising determining, by the model server, that the ML model is not loaded in memory, and in response: incrementing a cache miss, retrieving the ML model from a model storage, and loading the ML model to the memory of the model server.

6. The method of claim 1, wherein at least one of a maximum number of model servers and a minimum number of model servers is determined based on the ratio, and the number of model servers is adjusted based on the maximum number of model servers and the minimum number of model servers.

7. A non-transitory computer-readable storage medium coupled to one or more processors and having instructions stored thereon which, when executed by the one or more processors, cause the one or more processors to perform operations deployment of a multi-model machine learning (ML) inference service in a cloud environment, the operations comprising: receiving, by an application programming interface (API) server of a plurality of API servers, a prediction request from a client system, each of the plurality of API servers comprising a stateless server; selecting, by the API server, a model server from a plurality of model servers based on the prediction request, each of the plurality of model servers comprising a stateful server; calling, by the API server, the model server to execute inference using a ML model loaded to memory of the model server; receiving, by the API server, an inference result from the ML model; sending, by the API server, the inference result to the client system; periodically calculating a ratio based on a number of cache hits and a number of cache misses; and adjusting a number of model servers in the plurality of model servers based on the ratio.

8. The computer-readable storage medium of claim 7, wherein selecting a model server comprises: providing a list of model servers indicating one or more model servers that are currently deployed; calculating a hash value for each model server in the list of model servers; sorting the list of model servers based on hash values to provide a sorted list; and selecting the model server based on the sorted list.

9. The computer-readable storage medium of claim 8, wherein each hash value is calculated based on a concatenation of a node identifier of a respective model server and a model identifier of the ML model.

10. The computer-readable storage medium of claim 7, wherein operations further comprise determining, by the model server, that the ML model is loaded in memory, and in response, incrementing a cache hit.

11. The computer-readable storage medium of claim 7, wherein operations further comprise determining, by the model server, that the ML model is not loaded in memory, and in response: incrementing a cache miss, retrieving the ML model from a model storage, and loading the ML model to the memory of the model server.

12. The computer-readable storage medium of claim 7, wherein at least one of a maximum number of model servers and a minimum number of model servers is determined based on the ratio, and the number of model servers is adjusted based on the maximum number of model servers and the minimum number of model servers.

13. A system, comprising: a computing device; and a computer-readable storage device coupled to the computing device and having instructions stored thereon which, when executed by the computing device, cause the computing device to perform operations for deployment of a multi-model machine learning (ML) inference service in a cloud environment, the operations comprising: receiving, by an application programming interface (API) server of a plurality of API servers, a prediction request from a client system, each of the plurality of API servers comprising a stateless server; selecting, by the API server, a model server from a plurality of model servers based on the prediction request, each of the plurality of model servers comprising a stateful server; calling, by the API server, the model server to execute inference using a ML model loaded to memory of the model server; receiving, by the API server, an inference result from the ML model; sending, by the API server, the inference result to the client system; periodically calculating a ratio based on a number of cache hits and a number of cache misses; and adjusting a number of model servers in the plurality of model servers based on the ratio.

14. The system of claim 13, wherein selecting a model server comprises: providing a list of model servers indicating one or more model servers that are currently deployed; calculating a hash value for each model server in the list of model servers; sorting the list of model servers based on hash values to provide a sorted list; and selecting the model server based on the sorted list.

15. The system of claim 14, wherein each hash value is calculated based on a concatenation of a node identifier of a respective model server and a model identifier of the ML model.

16. The system of claim 13, wherein operations further comprise determining, by the model server, that the ML model is loaded in memory, and in response, incrementing a cache hit.

17. The system of claim 13, wherein operations further comprise determining, by the model server, that the ML model is not loaded in memory, and in response: incrementing a cache miss, retrieving the ML model from a model storage, and loading the ML model to the memory of the model server.

* * * * *